US006899754B2

(12) United States Patent
Yeh et al.

(10) Patent No.: US 6,899,754 B2
(45) Date of Patent: May 31, 2005

(54) INKJET INKS WITH INCREASED OPTICAL DENSITY

(75) Inventors: An-Gong Yeh, Broomall, PA (US); Jose E. Valentini, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/447,932

(22) Filed: May 29, 2003

(65) Prior Publication Data

US 2004/0035319 A1 Feb. 26, 2004

Related U.S. Application Data

(60) Provisional application No. 60/386,377, filed on Jun. 6, 2002.

(51) Int. Cl.[7] ............................................. C09D 11/02
(52) U.S. Cl. ................................. 106/31.6; 106/31.86
(58) Field of Search ............................ 106/31.6, 31.86

(56) References Cited

U.S. PATENT DOCUMENTS

| | | | |
|---|---|---|---|
| 3,279,935 A | 10/1966 | Daniell et al. | |
| 3,347,632 A | 10/1967 | Parker | |
| 5,554,739 A | 9/1996 | Belmont | |
| 5,571,311 A | 11/1996 | Belmont et al. | |
| 5,609,671 A | 3/1997 | Nagasawa | |
| 5,672,198 A | 9/1997 | Belmont | |
| 5,698,016 A | 12/1997 | Adams et al. | |
| 5,707,432 A | 1/1998 | Adams et al. | |
| 5,718,746 A | 2/1998 | Nagasawa et al. | |
| 5,747,562 A | 5/1998 | Mahmud et al. | |
| 5,749,950 A | 5/1998 | Mahmud et al. | |
| 5,755,861 A * | 5/1998 | Fujioka et al. ........... | 106/31.27 |
| 5,803,959 A | 9/1998 | Johnson et al. | |
| 5,837,045 A | 11/1998 | Johnson et al. | |
| 5,846,307 A | 12/1998 | Nagasawa et al. | |
| 5,851,280 A | 12/1998 | Belmont et al. | |
| 5,861,447 A | 1/1999 | Nagasawa et al. | |
| 5,885,335 A | 3/1999 | Adams et al. | |
| 5,895,522 A | 4/1999 | Belmont et al. | |
| 5,922,118 A | 7/1999 | Johnson et al. | |
| 5,928,419 A | 7/1999 | Uemura et al. | |
| 5,976,233 A | 11/1999 | Osumi et al. | |
| 6,057,384 A | 5/2000 | Nguyen et al. | |
| 6,099,632 A | 8/2000 | Nagasawa et al. | |
| 6,123,759 A | 9/2000 | Mise et al. | |
| 6,153,001 A | 11/2000 | Belmont et al. | |
| 6,221,141 B1 | 4/2001 | Takada et al. | |
| 6,221,142 B1 | 4/2001 | Wang et al. | |
| 6,221,143 B1 | 4/2001 | Palumbo | |
| 6,277,183 B1 | 8/2001 | Johnson et al. | |
| 6,281,267 B2 | 8/2001 | Parazak | |
| 6,312,100 B1 | 11/2001 | Loosli et al. | |
| 6,329,446 B1 | 12/2001 | Sacripante et al. | |
| 6,332,919 B2 | 12/2001 | Osumi et al. | |
| 6,375,317 B1 | 4/2002 | Osumi et al. | |
| 2001/0018472 A1 | 8/2001 | Parazak et al. | |
| 2001/0035110 A1 | 11/2001 | Kato | |
| 2002/0075369 A1 * | 6/2002 | Ota et al. ................. | 347/100 |
| 2002/0088375 A1 * | 7/2002 | Komatsu et al. ............ | 106/472 |

FOREIGN PATENT DOCUMENTS

| | | |
|---|---|---|
| EP | 0 997 506 A1 | 5/2000 |
| EP | A-1086997 | 3/2001 |
| EP | A-1114851 | 7/2001 |
| EP | A-1122286 | 8/2001 |
| EP | A-1158030 | 11/2001 |
| EP | A-1167471 | 1/2002 |
| WO | WO 01/10963 A1 | 2/2001 |
| WO | WO 01/25340 A1 | 4/2001 |
| WO | WO 01/9446 A2 | 12/2001 |

OTHER PUBLICATIONS

International Search Report (PCT/US 03/17257) dated Mar. 6, 2003.

* cited by examiner

*Primary Examiner*—Mark L. Bell
*Assistant Examiner*—Veronica F. Faison
(74) *Attorney, Agent, or Firm*—Bart E. Lerman

(57) ABSTRACT

This invention pertains to aqueous inkjet inks containing self-dispersing pigments and effective amounts of one or more multivalent cations, said inks having increased optical density when printed.

14 Claims, No Drawings

INKJET INKS WITH INCREASED OPTICAL DENSITY

CROSS-REFERENCE TO RELATED APPLICATION

This application claims priority under 35 U.S.C. §119 from U.S. Provisional Application Ser. No. 60/386,377 (filed Jun. 6, 2002), which is incorporated by reference herein as if fully set forth.

BACKGROUND OF THE INVENTION

This invention pertains to inkjet inks, in particular to inkjet inks comprising self-dispersing pigment formulated for improved optical density.

Inkjet recording is a printing method wherein droplets of ink are ejected through fine nozzles to form letters or figures on the surface of recording media. Inks used in such recording are subject to rigorous demands including, for example, good dispersion stability, ejection stability, and good fixation to media.

Both dyes and pigments have been used as colorants for inkjet inks. While dyes typically offer superior color properties compared to pigments, they tend to fade quickly and are more prone to rub off. Inks comprising pigments dispersed in aqueous media are advantageously superior to inks using water-soluble dyes in water-fastness and light-fastness of printed images.

Pigments suitable for aqueous inkjet inks are in general well-known in the art. Typically, pigments are stabilized by dispersing agents, such as polymeric dispersants or surfactants, to produce a stable dispersion of the pigment in the vehicle. More recently, so-called "self-dispersible" or "self-dispersing" pigments (hereafter "SDP(s)") have been developed. As the name would imply, SDPs are dispersible in water without dispersants.

SDPs are often advantageous over traditional dispersant-stabilized pigments from the standpoint of greater stability and lower viscosity at the same pigment loading. This can provide greater formulation latitude in final ink. SDPs, and particularly self-dispersing carbon black pigments, are disclosed in, for example, U.S. Pat. Nos. 2,439,442, 3,023,118, 3,279,935 and 3,347,632. Additional disclosures of SDPs, methods of making SDPs and/or aqueous ink jet inks formulated with SDP's can be found in, for example, U.S. Pat. Nos. 5,554,739, 5,571,311, 5,609,671, 5,672,198, 5,698,016, 5,707,432, 5,718,746, 5,747,562, 5,749,950, 5,803,959, 5,837,045, 5,846,307, 5,851,280, 5,861,447, 5,885,335, 5,895,522, 5,922,118, 5,928,419, 5,976,233, 6,057,384, 6,099,632, 6,123,759, 6,153,001, 6,221,141, 6,221,142, 6,221,143, 6,277,183, 6,281,267, 6,329,446, 6,332,919, 6,375,317, US2001/0035110, EP-A-1086997, EP-A-1114851, EP-A-1158030, EP-A-1167471, EP-A-1122286, WO01/10963, WO01/25340 and WO01/94476.

All of the preceding disclosures are incorporated by reference herein for all purposes as if fully set forth.

In general, the STPs are obtained by reaction of pigments. These reactions often lead to anionic or cationic species on the surface of the pigment. In the case of anionic species such as carboxyl groups, the charge of the anionic group is balanced by a cation. Normally, this cation charge comes from monovalent cations such as sodium, potassium or lithium.

One way to take advantage of the latitude afforded by SDPs is to load more pigment into the ink formulation to increase optical density (OD). However, it would be even more advantageous to achieve high optical density without increasing the level of colorant.

Previously incorporated U.S. Pat. No. 6,332,919 and EP-A-1086997 disclose a black inkjet ink comprising an SDP and salts of monovalent cations. It is suggested that the presence of these monovalent salts improves optical density at a given pigment loading.

Previously incorporated U.S. Pat. No. 6,277,183 discloses a black inkjet ink comprising an SDP ink and a metal oxide, where optical density of the ink is higher when metal oxide is present than when it is absent.

Previously incorporated U.S. Pat. No. 6,153,001 discloses an example of a black inkjet ink containing an SDP (Microjet® CW1) and 9 ppm calcium. No information is provided on the source or physical state of the calcium or on the nature of the SDP. No suggestion is made of any optical density relationship.

Previously incorporated U.S. Pat. No. 6,375,317 discloses an inkjet ink comprising an SDP and calcium in an aqueous medium. In the only example in such disclosure, the SDP is functionalized with -phenyl-COONa groups, but no indication of degree of treatment (functionality) is provided. These types of SDPs, however, are typically of higher functionality. In addition, in this example, only about 2 ppm of $Ca(OH)_2$ is used (about 1.2 ppm Ca). The calcium is said to be added to improve the ejection stability of the inks, and no suggestion is made of any optical density relationship connected to the addition of calcium.

It is an object of this invention to provided inkjet inks, in particular SDP-containing inkjet inks, with increased optical density, and to provide methods for increasing the optical density and/or stability of such inks.

SUMMARY OF THE INVENTION

We have found that the addition of small amounts of multivalent cations to an inkjet ink comprising certain SDP colorants can significantly increase the optical density of the printed ink on plain paper. It has also been found that adjustment of the multivalent cation level can enhance the optical density of the printed ink and/or enhance the stability of the ink prior to printing.

In accord with these findings, the present invention pertains in one aspect to an aqueous inkjet ink comprising:

an aqueous vehicle;

a self-dispersing pigment having at least one type of hydrophilic functional group bonded onto a surface of the self-dispersing pigment, the at least one type of hydrophilic functional group comprising a carboxyl group, and having a degree of functionalization of less than about 3 $\mu mol/m^2$; and an effective amount of a multivalent cation.

The present invention also relates to an improved aqueous inkjet ink comprising:

an aqueous vehicle; and a self-dispersing pigment having at least one type of hydrophilic functional group bonded onto a surface of the self-dispersing pigment, the at least one type of hydrophilic functional group comprising a carboxyl group, and having a degree of functionalization of less than about 3 $\mu mol/m^2$;

wherein the improvement comprises that said aqueous ink jet ink further comprises an effective amount of a multivalent cation.

In another aspect, the present invention pertains to a first method of enhancing the optical density of an aqueous inkjet ink, the aqueous ink jet ink comprising:

an aqueous vehicle; and a self-dispersing pigment having at least one type of hydrophilic functional group bonded onto a surface of the self-dispersing pigment, the at least one type of hydrophilic functional group comprising a carboxyl group, and having a degree of functionalization of less than about 3 $\mu mol/m^2$;

wherein said method comprises the step of providing in said aqueous inkjet ink an effective amount of a multivalent cation such that the optical density of the printed ink is greater with said effective amount of multivalent cation(s), as compared to without said multivalent cation.

In another aspect, the present invention pertains to a second method of enhancing the optical density and/or stability of an aqueous inkjet ink, the aqueous ink jet ink comprising:

an aqueous vehicle;

a self-dispersing pigment having at least one type of hydrophilic functional group bonded onto a surface of the self-dispersing pigment, the at least one type of hydrophilic functional group comprising a carboxyl group, and having a degree of functionalization of less than about 3 $\mu mol/m^2$; and an amount of a multivalent cation;

wherein said method comprises the step of adjusting the total amount of multivalent cation(s) in said aqueous inkjet ink such that the optical density of the printed ink is greater with said adjusted level of multivalent cation(s), and/or the stability of said aqueous inkjet ink is enhanced, as compared to without said adjusted level.

As used above and otherwise herein, "degree of functionalization" refers to the amount of hydrophilic groups present on the surface of the SDP per unit surface area, measured in accordance with the method described further herein.

As also used above and otherwise herein, an "effective amount" of a multivalent cation is an amount required to achieve an improvement of the optical density of the printed ink. In the context of the aqueous inkjet ink, improved aqueous inkjet ink and first method described above, the improvement is compared to an aqueous inkjet ink without the presence of the multivalent cation. In the context of the second method described above, the improvement is compared to the unadjusted level of the multivalent cation.

The choice of multivalent cation and the effective amount needed to improve optical density and/or stability is readily determined for each ink as provided for herein.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references to in the singular may also include the plural (for example, "a" and "an" may refer to one, or one or more) unless the context specifically states otherwise.

DETAILED DESCRIPTION OF THE PREFERRED EMBODIMENTS

Self-Dispersible Pigments (SDPs)

As indicated previously, SDPs are in a general sense well known to those of ordinary skill in the art, as exemplified by the numerous incorporated references listed above.

Typically, SDPs are pigments whose surface has been treated or modified to render them self-dispersible in water such that no separate dispersant is needed. The pigments may be black, such as carbon black, or may be colored pigments such as PB 15:3 and 15:4 cyan, PR 122 and 123 magenta, and PY 128 and 74 yellow.

Suitable SDPs in the context of the present invention are those in which are treated so as to bond at least one type of hydrophilic functional to the pigment surface. The hydrophilic functionality comprises a hydrophilic carboxyl group (—COOM), or a combination of —COOM and —OM groups, wherein M is a monovalent cation such as hydrogen, alkali metal, ammonium or organic ammonium. The hydrophilic group can be attached by direct bonding to the surface or attached through other atomic group(s). Examples of attachment of hydrophilic groups through other atomic group(s) include —R—COOM, where the group R represents aryl or alkyl. Examples of the alkali metal include lithium, sodium and potassium, rubidium and cesium. Examples of the organic ammonium include mono-, di- or trimethylammonium, mono-, di- or triethylammonium, and mono-, di- or trimethanolammonium.

More specifically, this surface-treated pigment may be prepared by grafting a functional group or a molecule containing a functional group onto the surface of the pigment, or by physical treatment (such as vacuum plasma), or by chemical treatment (for example, oxidation with ozone, hypochlorous acid or the like). A single type or a plurality of types of hydrophilic functional groups may be bonded to one pigment particle. The type and the degree functionalization may be properly determined by taking into consideration, for example, dispersion stability in ink, color density, and drying properties at the front end of an ink jet head.

Preferably, the SDP of the present invention is functionalized with hydrophilic groups at a level of less than about 3 $\mu mol/m^2$, more preferably less than about 1.8 $\mu mol/m^2$, even more preferably less than about 1.5 $\mu mol/m^2$.

Preferably, the hydrophilic functional group(s) on the SDP are primarily is carboxyl groups, or a combination of carboxyl and hydroxyl groups; even more preferably the hydrophilic functional groups on the SDP are directly attached and are primarily carboxyl groups, or a combination of carboxyl and hydroxyl.

Preferred pigments usable in the present invention may be produced, for example, by a method described in previously incorporated WO01/94476. Carbon black treated by the method described in this publication has a high surface-active hydrogen content that is neutralized with base to provide very stable dispersions in water. Application of this method to colored pigments is also possible.

A wide variety of organic and inorganic pigments, alone or in combination, are known in the art as suitable for inkjet. As with any pigmented inkjet ink, care must be taken to ensure that the pigment particles are small enough to avoid clogging or plugging the orifice of the nozzles that will be used to fire the ink. Small pigment particles also have an influence on the stability of the pigment dispersion, which is critical throughout the life of the ink.

Useful particle size is typically in the range of from about 0.005 micron to about 15 micron. Preferably, the pigment particle size should range from about 0.005 to about 5 micron, more preferably from about 0.005 to about 1 micron, and most preferably from about 0.005 to about 0.3 micron.

The levels of SDPs employed in the instant inks are those levels that are typically needed to impart the desired OD to the printed image. Typically, SDP levels are in the range of about 0.01 to about 10% by weight of the ink.

Multivalent Cation

The inks of this invention comprise one or more multivalent cations. The effective amounts needed in a particular situation can vary, and some adjustment, as provided for herein, will generally be necessary.

"Multivalent" indicates an oxidation state of two or more and, for an element "Z", are typically described as $Z^{2+}$, $Z^{3+}$, $Z^{4+}$ and so forth. For brevity, multivalent cations may be referred to herein as $Z^x$. The multivalent cations are preferably soluble in the aqueous ink vehicle and preferably exist in a substantially ionized state. The multivalent cations should be in a form where they are free and available to interact with ink components, in particular the SDP. A multivalent cation in unavailable form, for example $Z^x$ tightly bound as a refractory oxide, is not considered a multivalent cation for the purposes of this invention.

$Z^x$ includes, but is not limited to multivalent cations of the following elements: Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn, Pb. In one embodiment, the multivalent cation is not Ca. In another embodiment, the multivalent cation comprises at least one of Ca, Ba, Ru, Co, Zn and Ga. In yet another embodiment, the multivalent cation comprises at least one of Ba, Ru, Co, Zn and Ga. In a preferred embodiment, $Z^x$ comprises a trivalent cation.

$Z^x$ can be incorporated into ink by addition in a salt form or by addition in an alkaline form and used as a base in the adjustment of the ink pH. As with any dispersion, especially one that is ionically stabilized, the presence of large amounts of $Z^x$ can be destabilizing. The effective levels of $Z^x$ needed for the instant inks are below that which cause instability or other problems.

There is no particular lower limit of $Z^x$, although minimum levels contemplated by the instant invention are levels greater than trace or incidental amounts. Generally, there is at least about 2 ppm, commonly at least about 4 ppm, and even 10 ppm or more of multivalent in the ink. Likewise, there is no particular upper limit except as dictated by stability or other ink properties. At some level, though, there is no additional OD gain with increasing $Z^x$. In some cases, too much $Z^x$ may cause the OD to decrease again. In general, beneficial effects are achieved with less than about 200 ppm of $Z^x$, and typically even less than about 100 ppm.

Although the preceding discussion of $Z^x$ in terms of weight percent is provided for the sake of simple, concrete guidance, it will be appreciated from the examples herein after that the appropriate levels of multivalent cations are related in a more complex way to factors such as molar equivalents, atomic weight, valence state; and also, to the amount SDP in the ink and its level of treatment.

Thus a preferred method for considering multivalent cation content is by adjusted equivalents of $Z^x$ per 100 equivalents of surface function. The amount of Z present is adjusted (multiplied by) the valence state (x). An equation can be written as follows:

$$\text{Adjusted } Z \text{ per 100 surface function} = \frac{100 \text{ (equivalents } Z\text{) } (x)}{\text{equiv. of surface funct.}}$$

When $Z^x$ comprises more than one species of multivalent cation, the adjusted Z per 100 surface function is the sum of adjusted Z for all $Z^x$ species present. Preferred levels of adjusted Z per 100 surface function range between about 0.5 to 20, and more preferably between about 0.8 to 12.

In the preferred embodiment, the carboxyl functional group will, in general, be associated predominately with monovalent (M) counterions, with only a minor amount of cationic species present in the ink being $Z^x$. In an especially preferred embodiment, M is predominately potassium, rubidium or cesium or any combination thereof.

Aqueous Medium

The aqueous vehicle is water or a mixture of water and at least one water-soluble organic solvent. Selection of a suitable mixture depends on requirements of the specific application, such as desired surface tension and viscosity, the selected colorant, drying time of the ink, and the type of substrate onto which the ink will be printed. Representative examples of water-soluble organic solvents that may be selected are disclosed in U.S. Pat. No. 5,085,698 (incorporated by reference herein for all purposes as if fully set forth).

If a mixture of water and a water-soluble solvent is used, the aqueous vehicle typically will contain about 30% to about 95% water with the balance (i.e., about 70% to about 5%) being the water-soluble solvent. Preferred compositions contain about 60% to about 95% water, based on the total weight of the aqueous vehicle.

The amount of aqueous vehicle in the ink is in the range of about 70% to about 99.8%, preferably about 80% to about 99.8%, based on total weight of the ink.

Other Ingredients

The inkjet ink may contain other ingredients as are well known in the art. For example, anionic, nonionic, cationic or amphoteric surfactants may be used. In aqueous inks, the surfactants are typically present in the amount of about 0.01 to about 5%, and preferably about 0.2 to about 2%, based on the total weight of the ink.

Co-solvents, such as those exemplified in U.S. Pat. No. 5,272,201 (incorporated by reference herein for all purposes as if fully set forth) may be included to improve pluggage inhibition properties of the ink composition.

Biocides may be used to inhibit growth of microorganisms.

Other known additives may also be added to improve various properties of the ink compositions as desired. For example, penetrating agents such as glycol ethers and 1,2-alkanediols may be added to the formulation.

Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-iso-propyl ether.

1,2-Alkanediols are preferably 1,2-C1–6 alkanediols, most preferably 1,2-hexanediol.

The amount of glycol ether(s) and 1,2-alkanediol(s) added must be properly determined, but is typically in the range of from about 1 to about 15% by weight and more typically about 2 to about 10% by weight, based on the total weight of the ink.

Inclusion of sequestering (or chelating) agents such as ethylenediamine-tetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N", N"-pentaacetic acid (DTPA), and glycoletherdiamine-N,N,N',N'-tetraacetic acid (GEDTA), and salts thereof, may be advantageous.

In addition, binders such as polyurethanes may also be added.

Ink Properties

Jet velocity, separation length of the droplets, drop size and stream stability are greatly affected by the surface tension and the viscosity of the ink. Pigmented inkjet inks suitable for use with ink jet printing systems should have a surface tension in the range of about 20 dyne/cm to about 70 dyne/cm, more preferably about 25 to about 40 dyne/cm at 25° C. Viscosity is preferably in the range of about 1 cP to about 30 cP, more preferably about 2 to about 20 cP at 25° C. The ink has physical properties compatible with a wide range of ejecting conditions, i.e., driving frequency of the pen and the shape and size of the nozzle. The inks should have excellent storage stability for long periods. Further, the ink should not corrode parts of the inkjet printing device it comes in contact with, and it should be essentially odorless and non-toxic. Preferred inkjet printheads include those with piezo and thermal droplet generators.

EXAMPLES

Evaluation

OD measurements were taken from images made by an inkjet printer such as an Epson Stylus Color 980 printer (quality mode, 720 dpi). The images consisted of a sequence of 1 cm squares printed on plain paper, such as Hammermill Copy Plus. The percent ink coverage was chosen to maximize OD, but was no greater than 100% coverage. Nine squares were printed with each ink. Five different points within each square were measured for OD (with, for example, a Greytag spectro-densiometer); the OD recorded for each square was the highest OD value of these five measurements. The overall OD reported is the average of these nine individual OD values.

Inks of the instant invention are preferably storage stable for long periods without substantial increase in viscosity or particle size. Long-term storage is sometimes predicted from short-term exposure to elevated temperature in a closed container for a period or days or weeks (e.g. 60° C. for 7 days).

Determination of Degree of Functionalization (Acid Value)

The acid value of the SDP in these examples was determined by the equivalent moles of base (in this case KOH) required to neutralize the treated pigment to a pH of 7. As the surface hydrophilic groups are substantially all acidic, the acid value also equals the degree of functionalization.

The neutralized mixture was purified by ultra-filtration to remove free acids, salts, and contaminants. The purification process was performed to repeatedly wash pigment with de-ionized water until the conductivity of the mixture leveled off and remained relatively constant. Normally a large quantity of de-ionized water ranging from three- to ten-fold of the mixture volume was needed to achieve pigment purification.

After pigment was purified, the equivalent moles of potassium ions remaining on pigment was determined by atomic absorption (M) analysis using a Perkin Elmer model AA Analyst 300 Atomic Absorption Spectrometer configured with the AS-90 autosampler, AS-90/AS-91 controller, and Lumina lamps for potassium. The content was typically indicated as milligrams of metal counterion per kilogram of SDP, or ppm based on weight. Inductive Coupled Plasma (ICP) analysis was used to independently verify the counterion content; the values for ICP and AA were comparable. The following equations convert ppm into mmoles/g of pigment and $\mu$moles/$M^2$ of pigment surface: mmoles/g= (ppm/AW)/(1000 g/Kg×pigment %/100), wherein AW is atomic weight of the metal; and $\mu$moles/m2=mmoles/g×(1g/SA)×1000 ($\mu$mole/mmole), wherein SA is the pigment surface area in $m^2$ per gram.

Pigment Dispersion 1

Carbon black (Nipex 1801Q, Degussa, surface area=260 $m^2$/g) was treated with ozone according to the procedure described in WO0194476 until the desired level of surface functionalization was achieved. During the procedure, the dispersion was neutralized with KOH. The final concentration of pigment was 16.2%. The measured potassium counter ion in the dispersion after ultrafiltration was 2,614 ppm, which indicated a degree of surface functionalization of 0.41 mmole/g of pigment or 1.6 $\mu$mol/$m^2$ of pigment surface.

Pigment Dispersion 2

The procedure of pigment dispersion 1 was repeated, except with a lesser degree of treatment. The final concentration of pigment was 14.7%. The measured potassium in the dispersion after ultrafiltration was 1306 ppm, which indicates a degree of surface functionalization of 0.23 mmole/g or 0.90 $\mu$mol/$m^2$.

Pigment Dispersion 3

The procedure of pigment dispersion 1 was repeated. The final concentration of pigment was 13.2 wt % after ultrafiltration. The measured potassium in the dispersion at a pigment concentration of 9.4 wt % was 1090 ppm, which indicates a degree of surface functionalization of 0.29 mmole/g or 1.1 $\mu$mol/$m^2$.

Ink Formulation

Inks were made according to the general formulation below, with the appropriate multivalent cation added as indicated for each example. In each case, the weight percent pigment was 6.5. The multivalent cation was first dissolved in water and added to the formulation as the solution. Ingredients were added together, with stirring, in the sequence shown. After all ingredients were added, the ink was stirred for at least another 40 minutes, then filtered through a 2.5 micron filter. The final pH of the ink was adjusted to 8.0 with triethanolamine, as needed. Final counter ion concentrations in the ink varied from 0.035 to 0.02 adjusted equivalents per Kg of pigment (1 mole of divalent ions is counted as 2 adjusted equivalents).

TABLE 1

Ink Formulation-1

| Ingredients | Weight % |
| --- | --- |
| SDP dispersion | 6.5 |
| | (Pigment Dispersion 1 or 2) |
| Glycerol | 9.5 |
| Ethylene glycol | 6.0 |
| 1-2 hexanediol | 4.0 |
| Surfynol ® TG (surfactant) | 0.5 |
| Sodium EDTA | 0.1 |
| (as 5% solution) | |
| Proxel ® (biocide) | 0.2 |
| Multivalent cation solution | As indicated for each example |
| Water | Balance to 100% |

TABLE 2

Ink Formulation-2

| Ingredients | Weight % |
| --- | --- |
| SDP dispersion | 3.5 |
| | (Pigment Dispersion 3) |

TABLE 2-continued

Ink Formulation-2

| Ingredients | Weight % |
|---|---|
| Glycerol | 12.0 |
| Ethylene glycol | 6.0 |
| 1-2 hexanediol | 5.0 |
| Surfynol ® TG (surfactant) | 0.1 |
| Sodium EDTA (as 5% solution) | 0.1 |
| Multivalent cation solution | As indicated for each example |
| Water | Balance to 100% |

Results

Examples 1–9 and Control 1 (C1) in the following table were made with pigment dispersion 1.

TABLE 3

Tests of Ink from Polymer Dispersion 1

| EX | $Z^x$ | Amt solution (1) in gm added per 100 gm ink | ppm $Z^x$ in ink | Adj. Equiv Per Kg Pigment | OD | OD Std. Dev. | Adj. Z per 100 Pigment Surface Function |
|---|---|---|---|---|---|---|---|
| C1 | none | — | | 0 | 1.490 | 0.0146 | 0 |
| 1 | Ca | 1.14 | 4.6 | 0.0035 | 1.513 | 0.0112 | 0.85 |
| 2 | Ca | 3.42 | 14 | 0.0100 | 1.524 | 0.0120 | 2.4 |
| 3 | Ca | 5.20 | 23 | 0.0175 | 1.494 | 0.0071 | 4.2 |
| 4 | Zn | 1 | 8.5 | 0.004 | 1.534 | 0.0160 | 0.97 |
| 5 | Zn | 3 | 25.2 | 0.012 | 1.533 | 0.0125 | 2.9 |
| 6 | Zn | 5 | 42.4 | 0.020 | 1.522 | 0.0078 | 4.8 |
| 7 | Ba | 0.07 | 15.1 | 0.0029 | 1.500 | 0.018 | 0.7 |
| 8 | Ba | 0.21 | 45.3 | 0.0088 | 1.521 | 0.020 | 2.13 |
| 9 | Ba | 0.36 | 75.5 | 0.015 | 1.521 | 0.0093 | 3.63 |

Solution (1) is a 0.01 M Ca(OH)$_2$, 0.15 M Ba(OH)$_2$ or 0.0129 M ZnSO$_4$ aqueous solution.

The "Adj. X" column is calculated as the value of the "Adj. Equiv." column divided by the degree of surface functionalization (in mmoles/g pigment) for dispersion 1 times 100. Specifically for Examples 1–9, the "Adj. Z" column is thus equal to the ("Adj. Equiv" column×100)/0.41.

Example 10–24 and Control 2 (C2) in the following table were made with Pigment Dispersion 2.

TABLE 4

Tests of Ink from Polymer Dispersion 2

| EX | Zx | Amt solution (2) in gm added per 100 gm ink | Ppm $Z^x$ in ink | Adj. Equiv Per Kg Pigment | OD | OD Std Dev. | Adj. Z per 100 Pigment |
|---|---|---|---|---|---|---|---|
| C2 | none | | | 0 | 1.625 | 0.0084 | 0 |
| 10 | Ca | 1.14 | 4.6 | 0.0035 | 1.663 | 0.0176 | 1.4 |
| 11 | Ca | 3.42 | 14 | 0.0100 | 1.650 | 0.0110 | 4.2 |
| 12 | Ca | 5.20 | 23 | 0.0175 | 1.642 | 0.0110 | 7.4 |
| 13 | Zn | 1 | 8.5 | 0.004 | 1.658 | 0.0110 | 1.7 |
| 14 | Zn | 3 | 25.2 | 0.012 | 1.633 | 0.008 | 5.1 |
| 15 | Zn | 5 | 42.4 | 0.020 | 1.655 | 0.011 | 8.4 |
| 16 | Ru | 1.3 | 8.75 | 0.004 | 1.640 | 0.011 | 1.7 |
| 17 | Ru | 3.9 | 26.25 | 0.012 | 1.663 | 0.016 | 5.1 |
| 18 | Ru | 6.5 | 43.75 | 0.02 | 1.668 | 0.01 | 8.4 |
| 19 | Co | 1.3 | 5.1 | 0.004 | 1.678 | 0.016 | 1.7 |
| 20 | Co | 3.9 | 15.3 | 0.012 | 1.683 | 0.018 | 5.1 |
| 21 | Co | 6.5 | 25.1 | 0.02 | 1.678 | 0.013 | 8.4 |
| 22 | Ga | 1.3 | 6.0 | 0.004 | 1.690 | 0.011 | 1.7 |
| 23 | Ga | 3.9 | 18.0 | 0.012 | 1.683 | 0.02 | 5.1 |
| 24 | Ga | 6.5 | 30.0 | 0.02 | 1.678 | 0.0117 | 8.4 |

Solution (2) is a 0.01 M Ca (OH)$_2$, 0.0129 M ZnSO$_4$, 0.00674 M RuCl$_3$, 0.0066 M CoF$_3$ or 0.0033 M Ga3(SO$_4$)$_2$ aqueous solution.

The "Adj. Z" column is calculated as the value of the "Adj. Equiv." column divided by the degree of surface functionalization (in mmoles/g pigment) for dispersion 2 times 100. Specifically for Examples 10–24, the "Adj. Z" column is thus equal to the ("Adj. Equiv" column×100)/ 0.23.

Examples 25–30 and Control 3 (C3) in the following table were made with Pigment Dispersion 3.

TABLE 5

Tests of Ink from Polymer Dispersion 3

| EX | $Z^x$ | Amt solution (3) in gm added per 100 gm ink | ppm $Z^x$ in ink | Adj. Equiv Per Kg Pigment | OD | OD Std. Dev. | Adj. Z per 100 Pigment Surface Function |
|---|---|---|---|---|---|---|---|
| C3 | none | — | 0 | 0 | 1.510 | 0.001 | 0 |
| 25 | Cu | 0.70 | 0.2 | 0.002 | 1.515 | 0.002 | 0.7 |
| 26 | Cu | 4.20 | 1.4 | 0.012 | 1.518 | 0.002 | 4.1 |
| 27 | Cu | 25.20 | 8.2 | 0.072 | 1.520 | 0.001 | 24.8 |
| 28 | Sn | 0.70 | 0.4 | 0.004 | 1.515 | 0.002 | 1.3 |
| 29 | Sn | 4.20 | 2.4 | 0.024 | 1.521 | 0.001 | 8.2 |
| 30 | Sn | 25.20 | 14.4 | 0.144 | 1.525 | 0.001 | 49.2 |

Solution (3) is a 0.01 M $Cu(NO_3)_2$ 5 $H_2O$ or 0.01 M $Sn(Cl)_4$ 5 $H_2O$ aqueous solution.

The "Adj. Z" column is calculated as the value of the "Adj. Equiv." column divided by the degree of surface functionalization (in mmoles/g pigment) for dispersion 3 times 100. Specifically for Examples 25–30, the "Adj. Z" column is thus equal to the ("Adj. Equiv" column×100)/ 0.29.

There was a significant increase in OD with the addition of appropriate amounts of multivalent cations, as demonstrated by the examples relative to the controls. The effect was more pronounced in SDP with lower treatment level. The effect was also somewhat more pronounced with trivalent cations than with divalent cations. The effect levels off once a certain amount of $Z^x$ was reached; additional $Z^x$ did not seem to help and in some cases OD was even reduced.

We claim:

1. An aqueous inkjet ink comprising:

an aqueous vehicle;

a self-dispersing pigment having at least one type of hydrophilic functional group bonded onto a surface of the self-dispersing pigment, the at least one type of hydrophilic functional group comprising a carboxyl group, and having a degree of functionalization of less than about 3 $\mu mol/m^2$; and an effective amount of a multivalent cation to improve optical density of the printed ink.

2. The aqueous inkjet ink of claim 1, wherein the degree of functionalization of said self-dispersible pigment is less than about 1.8 $\mu mol/m^2$.

3. The aqueous inkjet ink of claim 1, wherein the degree of functionalization of said self-dispersible pigment is less than about 1.5 $\mu mol/m^2$.

4. The aqueous inkjet ink of claim 1, wherein the multivalent cation is present at a level of at least 2 ppm.

5. The aqueous inkjet ink of claim 1, wherein the hydrophilic functional groups on the self-dispersible pigment are directly attached, and are primarily carboxyl groups, or a combination of carboxyl and hydroxyl groups.

6. The aqueous inkjet ink of claim 1, wherein the multivalent cation is selected from one or more of the group of multivalent cations of elements Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn and Pb.

7. The aqueous inkjet ink of claim 1, wherein a multivalent cation comprises a trivalent cation.

8. The aqueous inkjet ink of claim 1, wherein the multivalent cation is present in an amount such that an adjusted Z per 100 surface function is in the range of from about 0.5 to about 20.

9. The aqueous inkjet ink of claim 1, wherein the multivalent cation is present in an amount such that an adjusted Z per 100 surface function is in the range of from about 0.8 to about 12.

10. An improved aqueous inkjet ink comprising:

an aqueous vehicle;

a self-dispersing pigment having at least one type of hydrophilic functional group bonded onto a surface of the self-dispersing pigment, the at least one type of hydrophilic functional group comprising a carboxyl group, and having a degree of functionalization of less than about 3 $\mu mol/m^2$;

wherein the improvement comprises that said aqueous ink jet ink further comprises an effective amount of a multivalent cation to improve optical density of the printed ink.

11. A method of enhancing the optical density of an aqueous inkjet ink, the aqueous ink jet ink comprising:

an aqueous vehicle; and a self-dispersing pigment having at least one type of hydrophilic functional group bonded onto a surface of the self-dispersing pigment, the at least one type of hydrophilic functional group comprising a carboxyl group, and having a degree of functionalization of less than about 3 $\mu mol/m^2$;

wherein said method comprises the step of providing in said aqueous inkjet ink an effective amount of a multivalent cation such that the optical density of the printed ink is greater with said effective amount of multivalent cation(s), as compared to without said multivalent cation.

12. A method of enhancing the optical density of an aqueous inkjet ink, the aqueous ink jet ink comprising:

an aqueous vehicle;

a self-dispersing pigment having at least one type of hydrophilic functional group bonded onto a surface of the self-dispersing pigment, the at least one type of hydrophilic functional group comprising a carboxyl group, and having a degree of functionalization of less than about 3 $\mu mol/m^2$; and an amount of a multivalent cation;

wherein said method comprises the step of adjusting the total amount of multivalent cation(s) in said aqueous inkjet ink such that the optical density of the printed ink is greater with said adjusted level of multivalent cation(s), as compared to without said adjusted level.

13. The method of claim 12, wherein the multivalent cation is adjusted so that an adjusted Z per 100 surface function is in the range of from about 0.5 to about 20.

14. The method of claim 12, wherein the multivalent cation is adjusted so that an adjusted Z per 100 surface function is in the range of from about 0.8 to about 12.

* * * * *